US008823666B2

(12) United States Patent
Hong (10) Patent No.: US 8,823,666 B2
(45) Date of Patent: Sep. 2, 2014

(54) TOUCH SENSOR PANEL (75) Inventor: Woncheol Hong, Seoul (KR)

(73) Assignee: Dongbu Hitek Co., Ltd., Seoul (KR)

( * ) Notice: Subject to any disclaimer, the term of this patent is extended or adjusted under 35 U.S.C. 154(b) by 99 days.

(21) Appl. No.: 13/474,579

(22) Filed: May 17, 2012

(65) Prior Publication Data

US 2013/0050108 A1 Feb. 28, 2013

(30) Foreign Application Priority Data

Aug. 23, 2011 (KR) ........................ 10-2011-0083916

(51) Int. Cl.
    *G09G 5/00* (2006.01)
    *G06F 3/041* (2006.01)
    *G06F 3/044* (2006.01)

(52) U.S. Cl.
    CPC .............. *G06F 3/0416* (2013.01); *G06F 3/044* (2013.01)
    USPC ...... 345/173; 345/174; 178/18.01; 178/18.06

(58) Field of Classification Search
    USPC ..................... 345/173–178; 178/18.01–18.06
    See application file for complete search history.

(56) References Cited

U.S. PATENT DOCUMENTS

| | | | |
|---|---|---|---|
| 6,297,811 B1 * | 10/2001 | Kent et al. ..................... | 345/173 |
| 8,111,248 B2 | 2/2012 | Lee et al. | |
| 2010/0066702 A1 | 3/2010 | Lee et al. | |
| 2011/0063251 A1 | 3/2011 | Geaghan et al. | |
| 2011/0148809 A1 * | 6/2011 | Kanehira et al. .............. | 345/174 |
| 2011/0199333 A1 * | 8/2011 | Philipp et al. ................. | 345/174 |
| 2011/0247884 A1 * | 10/2011 | Kim et al. ................... | 178/18.03 |
| 2012/0105350 A1 | 5/2012 | Lee et al. | |

FOREIGN PATENT DOCUMENTS

| | | |
|---|---|---|
| JP | 2010-122951 | 6/2010 |
| JP | 2011-123859 | 6/2011 |
| KR | 10-2010-0031243 A | 3/2010 |
| KR | 10-2010-0067236 A | 6/2010 |

OTHER PUBLICATIONS

Hyung Seok Park, Deuk Su Lee and In Hyuk Song; "Touch Panel, Method for Manufacturing the Same and Liquid Crystal Display Device Using Thereof"; espacenet—Bibliographic data; Korean Publication No. KR20100067236 (A); Publication Date: Jun. 21, 2010; Worldwide Database, http://worldwide.espacenet.com/publicationDetails/biblio? DB=EPODOC&II=1&ND=3&a . . . .

In Hyuk Song, Hyung Seok Park and Deuk Su Lee; "Liquid Crystal Display Device"; espacenet—Bibliographic data; Korean Publication No. KR20100031243 (also published as KR101002308); Publication Date: Mar. 22, 2010; Worldwide Database, http://worldwide.espacenet.com/publicationDetails/biblio?DB=EPODOC&II=0&ND=3&a . . . .

Kanehira Hironori; Sato Katsunori; Miyata Kazutomo; Input Apparatus and Display Apparatus; Abstract of JP 2011123859; Jun. 23, 2011; http://worldwide.espacenet.com/.

Hiratsuka Kazuyuki; Input Device; Abstract of JP 2010122951; Jun. 3, 2010; http://worldwide.espacenet.com/.

\* cited by examiner

*Primary Examiner* — Jennifer Nguyen
(74) *Attorney, Agent, or Firm* — Andrew D. Fortney; Murabito Hao & Barnes LLP (57) ABSTRACT

A touch sensor panel includes at least one first electrode, and a second electrode above the at least one first electrode configured to cross the at least one first electrode, and having one or more openings therein.

20 Claims, 11 Drawing Sheets

TOUCH SENSOR PANEL

RELATED APPLICATIONS

This application claims the benefit of Korean Patent Application No. 10-2011-0083916, filed on Aug. 23, 2011, which is hereby incorporated by reference as if fully set forth here in.

FIELD OF THE INVENTION

The present invention relates to a touch sensor panel. In particular, the present invention relates to a two-layer mutual type touch sensor panel that measures mutual capacitance between a sensing layer and a driving layer to sense touch, presents various sensing layer patterns capable of maximizing the contour line of the sensing layer where mutual capacitance changes due to an external object and reducing the area of empty space in the central portion of the sensing layer pattern. When a user touches the surface of a display unit of a touch sensor panel with his/her body part, such as his/her finger, parasitic capacitance between the body part, such as the finger, and the sensing layer of the touch sensor panel is minimized to more accurately measure the mutual capacitance between the sensing layer and the driving layer, thereby increasing sensing accuracy.

BACKGROUND OF THE INVENTION

In general, in a personal computer, a mobile communication device, and other personal information processing devices, an interface with a user is established using various input, devices, such as a keyboard, a mouse, or a digitizer. With the increasing development of mobile communication equipment, it is difficult to increase the degree of completion of products using only input devices, such as a keyboard and a mouse. Accordingly, there is an increased demand for a portable input device capable of achieving a simple structure and reducing erroneous operation. In order to meet such demand, a touch panel has been proposed in which the user directly touches the surface thereof with a hand (or a part thereof, such as a finger), a pen, or the like to input information.

This touch panel advantageously has a simple structure, less erroneous operation, character input capability without using other input devices, ease of transportation, and ease of user understanding. Accordingly, the touch panel is widely used in various information processing devices.

The touch panel is classified depending on the method of sensing a touch portion, and includes a resistive type in which a metal electrode is formed on an upper plate or a lower plate, and a touch position is determined depending on the voltage gradient based on resistance in a state where a DC voltage is applied to the metal electrode, a capacitive type in which the equipotential is formed in a conductive film and a touch positron is determined when a change in voltage of the upper or lower plate occurs due to a touch operation, an electromagnetic type in which the LC value induced when an electronic pen touches the conductive film is read to sense a touch position, and the like.

In one of the conventional methods of driving a touch panel, a method is known in which the touch panel is arranged on the display, and a change in an output signal is sensed in response to an input signal, such as current, to sense a touch position of a body part. This is called a mutual type or a mutual capacitance touch sensing type.

Figure 1:
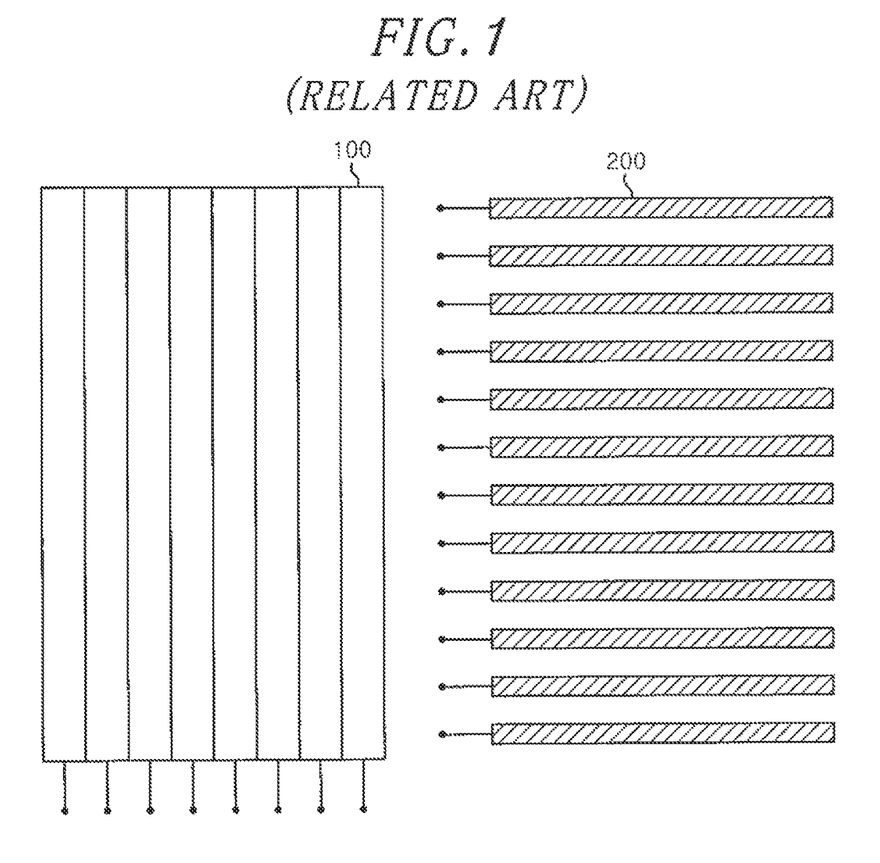
FIG. 1 is a diagram illustrating a driving layer pattern and a sensing layer pattern of the related art.
Figure 2:
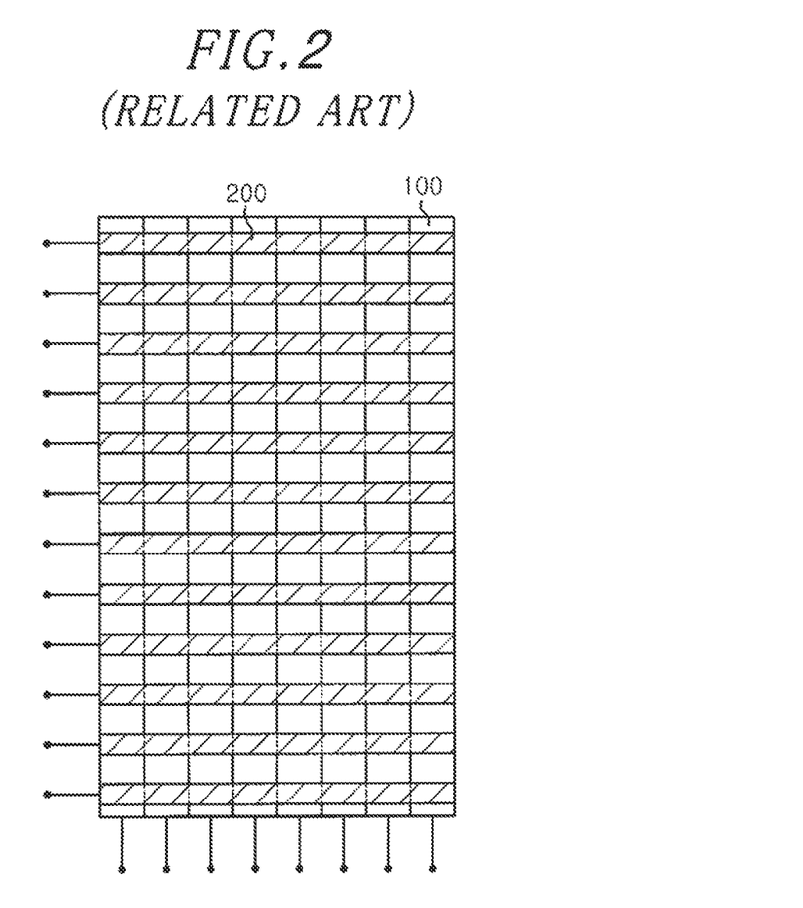
FIG. 2 is a diagram illustrating a combination of a driving layer pattern and a sensing layer pattern of the related art.

FIG. 1 shows a mutual type touch panel of the related art. The mutual type touch panel of the related art shown in FIG. 1 is configured such that separate bar-like driving layer 100 and sensing layer 200 are arranged perpendicular to each other, as shown in FIG. 2. Further, an insulating layer 102 is interposed between the driving layer 100 and sensing layer 200, as shown in FIG. 3.

Figure 3:
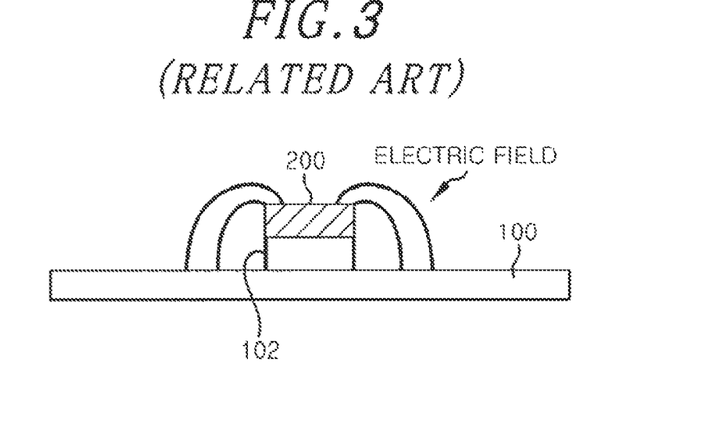
FIG. 3 is a diagram illustrating the occurrence of mutual capacitance between a driving layer and a sensing layer of the related art.

In the mutual type touch panel configured as shown in FIG. 3, when a body part, such as a finger, touches the upper part of the touch panel, a change in mutual capacitance between the sensing layer 200 and the driving layer 100 is measured to sense the presence/absence of a touch operation.

Figure 4:
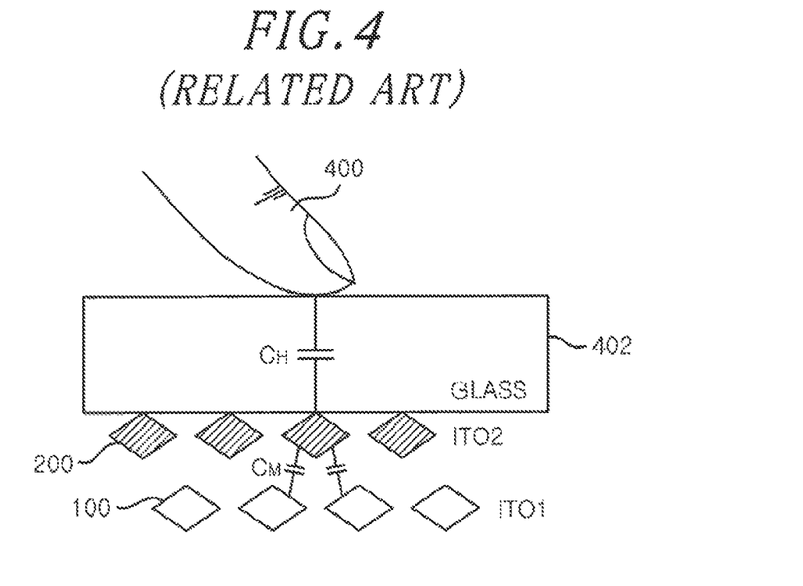
FIG. 4 is a diagram illustrating the occurrence of parasitic capacitance in a touch panel of the related art.

At this time, as shown in FIG. 4, an undesired capacitance (e.g., parasitic capacitance) CH is formed between a body part 400, such as the finger of a person who touches the protective film 402 (e.g., glass) at the upper part of the touch panel and the sensing layer 200. The parasitic capacitance value affects the value of mutual capacitance CM for measuring the presence/absence of a touch operation. Accordingly, it is necessary to change the pattern of the sensing layer 200 to reduce or minimize parasitic capacitance.

Figure 5:
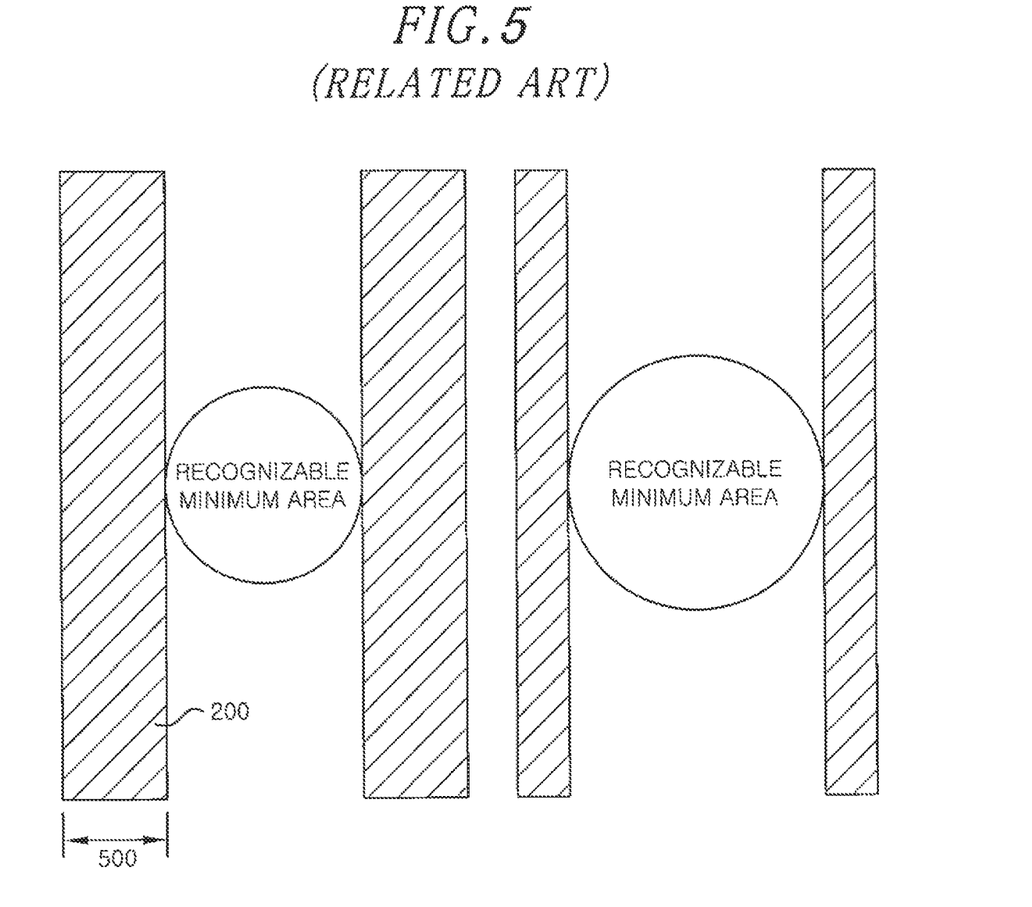
FIG. 5 is a diagram illustrating a recognizable minimum area of a sensing layer of the related art.

To this end, in the related art, as shown in FIG. 5, there is an attempt to decrease the width 500 of the sensing layer, thereby reducing parasitic capacitance between the body part, such as the finger which touches the protective film, and the sensing layer.

As shown in FIG. 5, when the width of the sensing layer decreases, parasitic capacitance between the sensing layer and the body part, such as the finger, also decreases, causing a decreased parasitic capacitance component to be measured. However, there is a problem in that a resistance component increases, causing a decrease in a current or voltage resulting from mutual capacitance.

If the width of the sensing layer 200 is excessively small, as shown in FIG. 5, the minimum area between the sensing layers for recognizing the body part expands, making it difficult to recognize an object having a small area during a touch operation.

SUMMARY OF THE INVENTION

In view of the above, the present invention provides a two-layer mutual type touch sensor panel that measures mutual capacitance between a sensing layer and a driving layer to sense a touch operation, provides various sensing layer patterns capable of maximizing the contour line of the sensing layer and reducing an empty space area (e.g., an opening) in the central portion of a sensing layer pattern, and when a user touches the surface of a touch sensor panel (e.g., in a display unit) with his/her body part, such as his/her finger, minimizes parasitic capacitance between the body part, such as the finger, and the sensing layer of the touch sensor panel to more accurately measure mutual capacitance between the sensing layer and the driving layer, thereby increasing sensing accuracy.

In accordance with an embodiment of the present invention, there is provided a touch sensor panel including at least one first electrode and a second electrode above the at least one first electrode, having a longest axis perpendicular to a longest axis of the first electrode, and having one or more openings therein.

The first electrode may include a plurality of electrodes arranged in parallel.

The second electrode may have a bar pattern arranged to cross the first electrode(s), and when the second electrode has a plurality of openings, the second electrode may have a bridge region between adjacent openings.

The second, electrode may have a bridge region between each of the adjacent openings that is positioned above a corresponding one of the first, electrode (s).

Alternatively, when there is a plurality of first electrodes, the second electrode may be arranged such that a bridge region is positioned between adjacent ones of the at least one first electrode.

Each of the at least one first electrode (s) may also have a bar pattern.

The second electrode may have a bar pattern arranged above the first electrode and to cross the first electrode, one or more openings with an empty space in the central portion thereof, and/or a crenellated (or concavo-convex) pattern.

The second electrode may have bar patterns having a given length that protrude from a central portion of the second electrode adjacent to an opening.

The second electrode may have bar patterns having a given length, that protrude from opposed lateral portions of each opening.

The second electrode may have a plurality of rectangular patterns each having an opening in the central portion thereof and arranged at regular intervals.

Each of the first electrode (s) may be a transparent electrode or a nontransparent electrode.

The second electrode may also be a transparent electrode or a nontransparent electrode.

An insulating layer may be between the first electrode (s) (e.g., the driving layer) and the second, electrode(s) (e.g., the sensing layer).

The present two-layer mutual type touch sensor panel measures mutual capacitance between the sensing layer and the driving layer to sense a touch operation, and provides various sensing layer patterns capable of maximizing the contour line of the sensing layer and reducing an area that may cause parasitic capacitance with a human body by forming an empty space or opening in the central portion of the sensing layer pattern. Accordingly, when a user touches the surface of a display unit of a touch sensor panel with his/her body part, such as his/her finger, it is possible to minimize parasitic capacitance between the body part, such as the finger, and the sensing layer of the touch sensor panel to more accurately measure mutual capacitance between the sensing layer and the driving layer, thereby increasing sensing accuracy.

In regard to the sensing layer pattern, since various patterns in which one or more empty spaces or openings are formed in the central portion of the bar pattern, it is possible to narrow the interval between the sensing layers while minimizing parasitic capacitance compared to the bar pattern of the related art, thereby reducing the minimum touch area. It is also possible to decrease the resistances of the sensing layer and the driving layer, making it possible to more accurately measure the mutual capacitance between the sensing layer and the driving layer.

BRIEF DESCRIPTION OF THE DRAWINGS

The above and other features of the present invention will become apparent from the following description of an embodiment given in conjunction with the accompanying drawings, in which.

DETAILED DESCRIPTION OF THE EMBODIMENT

Hereinafter, operation of the invention will be described in detail with reference to the accompanying drawings. In the following description of the present invention, a detailed description of the already known structures and operations may confuse the subject matter of the present invention, and therefore, the detailed description thereof will be omitted. The following terms have been defined by considering functions in the embodiments of the present invention and may be changed for the invention and practice. Hence, the terms may be defined throughout the description of the present invention.

Figure 6:
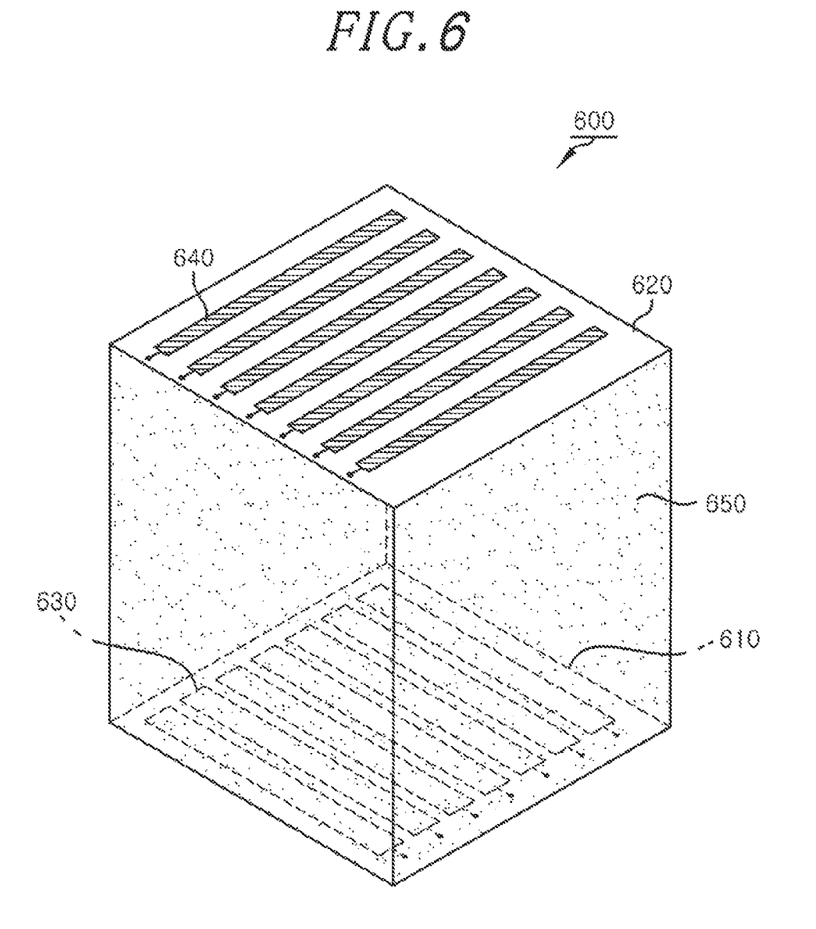
FIG. 6 is a diagram illustrating the structure of a touch sensor panel in accordance with an embodiment, of the present invention.

FIG. 6 shows the structure of a two-layer mutual type touch sensor panel in accordance with an embodiment of the invention. Further, an insulating material 650 is interposed between the driving layer 630 and sensing layer 640.

Referring to FIG. 6, a touch sensor panel 600 has a lower insulating sheet 610 and an upper insulating sheet 620 that are bonded to each other at a predetermined interval. A driving layer 630 and a sensing layer 640 may respectively comprise indium tin oxide (ITO) electrodes or metal electrodes on the surfaces of the lower insulating sheet 610 and the upper insulating sheet 620 that race each other and are perpendicular to each other.

In the touch sensor panel 600, there is a predetermined capacitance (e.g., a mutual capacitance CM) at each intersection of the underlying driving layer 630 and the overlying sensing layer 640, where they are arranged to cross each other. If a body part, such as a finger, approaches the touch sensor panel 600, part of the mutual capacitance is induced in the underlying driving layer by the object that touches the touch sensor panel, and the mutual capacitance CM changes, thereby sensing the presence/absence of the touch operation.

In the mutual type touch sensor panel, from the viewpoint of accurate sensing of a touch signal, it is very important to reduce parasitic capacitance CH between the body part of a person who touches the protective film and the sensing layer.

In the method of the related art in which the width of the sensing layer becomes small so as to decrease parasitic capacitance, it is possible to decrease parasitic capacitance between the sensing layer and the body part, such as the finger. Meanwhile, as described above, there is a problem in that decreasing the parasitic capacitance causes the resistance component to increase, thereby causing a decrease in a current or voltage resulting from mutual capacitance.

Accordingly, the present invention provides a sensing layer with various patterns capable of decreasing parasitic capacitance without decreasing the width of the sensing layer 640.

Figure 7:
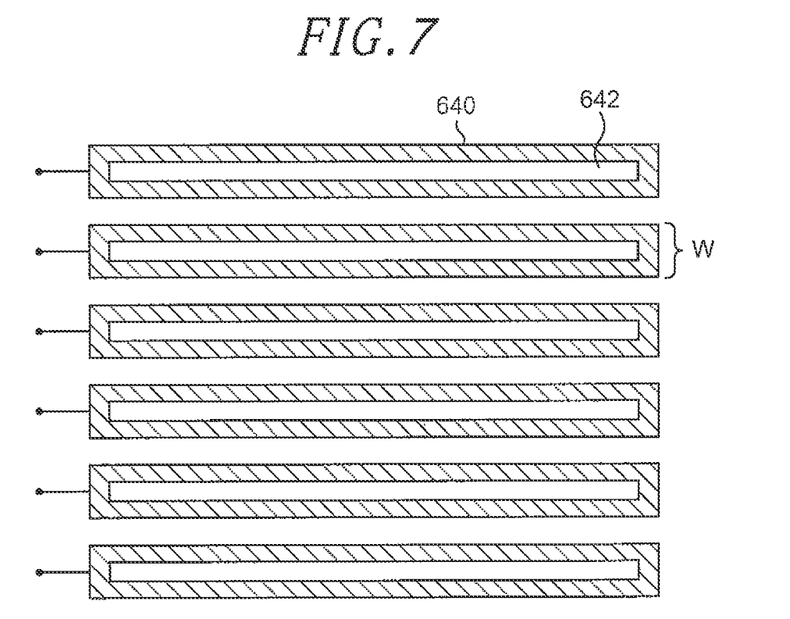
FIG. 7 is a diagram illustrating a sensing layer pattern in accordance with an embodiment of the present invention.

FIG. 7 shows a first pattern of the sensing layer 640 in accordance with an embodiment of the present invention.

Referring to FIG. 7, in accordance with an embodiment of the present invention, the sensing layer 640 is formed in a bar shape having a width (W) such that the minimum area between the sensing layers 640 for recognizing the touch operation of the body part, such as the finger, is satisfied, and an empty space is formed in the central portion of the sensing layer 640 to form an opening 642, thereby decreasing parasitic capacitance. Accordingly, the sensing layer 640 may have a width (W) such that the minimum area, for recognizing the touch operation of the body part, such as the finger, is satisfied, and the opening 642 reduces the total area of the sensing layer 640. For example, the width W of the bar pattern (including the opening) may be from about 0.5-4,000 µm or any range therein (e.g., 1.5-2,000 µm, 5-1,000 µm and the like). Additionally, the width of the opening 642 may be from about 0.2-2,000 µm or any range therein (e.g., 0.5-1000 µm, 2-500 µm and the like). Furthermore, the width of the bar pattern of sensing layer 640 for sensing a pen or stylus may be from about 0.5-1,000 µm (e.g., 1-500 µm), and the opening 642 may have a length of from about 0.2 to about 500 µm (e.g., 0.35-200 µm).

Therefore, it is possible to minimize parasitic capacitance CH between the body part, such as the finger, and the sensing layer 640, making it possible to more accurately measure mutual capacitance CM between the sensing layer 640 and the driving layer 630.

Figure 8:
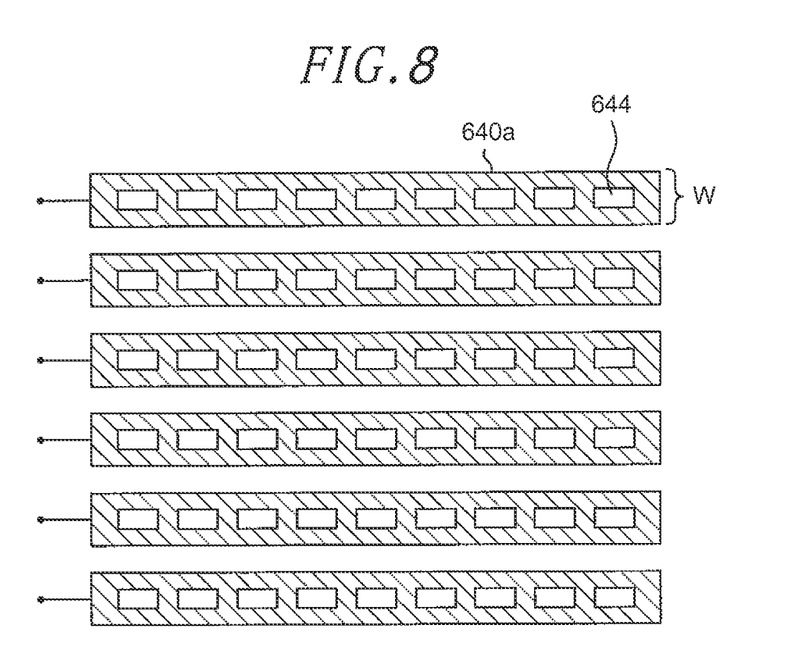
FIG. 8 is a diagram illustrating a sensing layer pattern in accordance with another embodiment of the present invention.

FIG. 8 shows a sensing layer pattern in accordance with another embodiment of the invention.

Referring to FIG. 8, in accordance with another embodiment of the present invention, the sensing layer 640a is formed in a bar shape having a width such that the minimum area between the sensing layer 640a for recognizing the touch operation of the body part, such as the finger, is satisfied, and openings are formed in the central portion of the sensing layer 640a to decrease parasitic capacitance. Unlike FIG. 7, FIG. 8 shows a case where a plurality of openings 644 are formed in a ladder shape in the central portion of the sensing layer 640a in a bar pattern having a given width W. The sensing layer 640a may have the same dimensions as those discussed above with respect to FIG. 7, but openings 644 may have a length of about 0.5-5,000 µm or any range therein (e.g., 1-3,000 µm). The inter-opening spacing between adjacent, openings 644 in a given sensing layer pattern 640a may be the same as or different from the length of openings 644 (e.g., 0.5-5,000 µm). With the formation of the openings, an increase in resistance due to a decrease in the width of the electrode is reduced.

Accordingly, the sensing layer 640a may have a width such that the minimum area for recognizing the touch operation of the body part, such as the finger, is satisfied, and the openings are formed to reduce the total area of the sensing layer 640a. Therefore, it is possible to minimize parasitic capacitance CH between the body part, such as the finger, and the sensing layer 640a, making it possible to more accurately measure mutual capacitance CM between the sensing layer 640a and the driving layer 630.

Figure 9A:
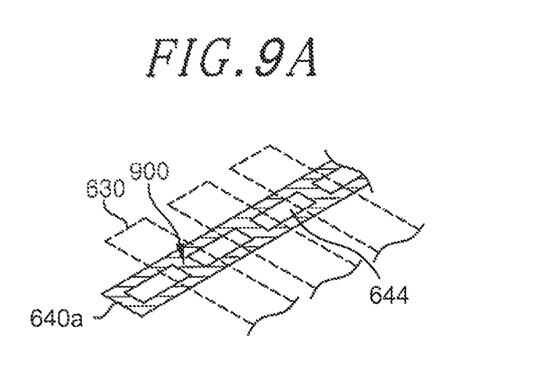
FIGS. 9A and 9B are diagrams illustrating the layout of a sensing layer and a driving layer in accordance with an embodiment of the present invention.
Figure 9B:
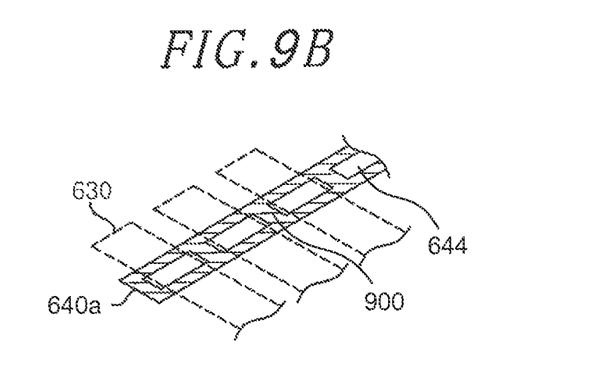

The layout including the underlying driving layer 630 shown in FIG. 6 and the sensing layer 640a shown in FIG. 8, in which a plurality of openings 644 are formed in a ladder shape, may be arranged such that, as shown in FIG. 9A, the driving layer 630 is under a bridge region 900 between adjacent openings 644 of the sensing layer 640a, or may be arranged such that, as shown in FIG. 9B, the driving layer 630 is under the central portion of each opening 644 of the sensing layer 640a.

Figure 10:
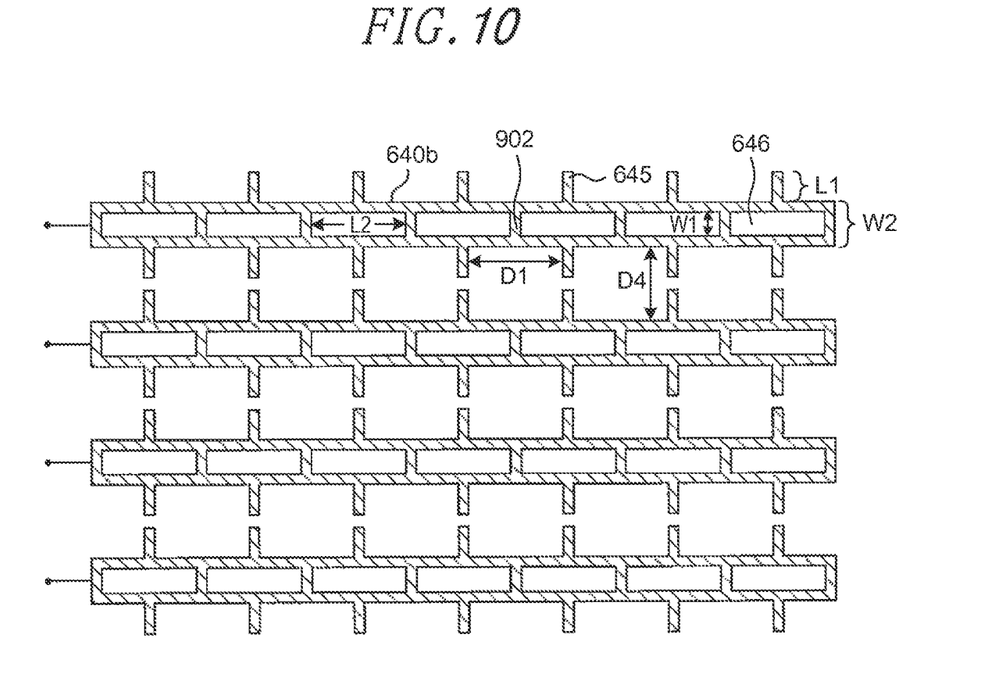
FIGS. 10 to 13 are diagrams illustrating various sensing layer patterns in accordance with other embodiments of the present invention.

FIG. 10 shows a sensing layer pattern in accordance with another embodiment of the invention.

Referring to FIG. 10, the sensing layer 640b has a bar shape having a width such that the minimum area between the sensing layers 640b for recognizing the touch operation of the body part, such as the finger, is satisfied, and a plurality of openings 646 are formed in a ladder shape in the central portion of the sensing layer 640b of the bar pattern. In this case, unlike FIG. 8, bar patterns 645 protrude from the sensing layer 640b adjacent to a central portion of each opening 646, thereby decreasing parasitic capacitance. Bar patterns or protrusions 645 may have a length L1 of from about 0.2-2,000 µm, or any range of values therein (e.g., 1-500 µm). The length of different protrusions 645 may be the same or may vary. In addition, the protrusions 645 may have a width equal to the width of the longitudinal lines in the bar pattern of the sensing layer 640b.

Additionally, the distance D1 between adjacent bar protrusions 645 may be about equal to the length L2 of the openings 646 plus the length of the bridge 902, minus the width of protrusions 645 (or, when the length of the bridge 902 is equal to a width of the protrusion 645, the length of the opening 646). Furthermore, a distance D4 between adjacent sensing layers 640b is equal to or greater than twice the length L1 of bar patterns 645 plus the width of sensing layer 640b (e.g., about 1-10,000 µm). Other dimensions of sensing layer 640b may be the same as or different from bar patterns 640 and/or 640a discussed above with respect to FIGS. 7 and 8, respectively.

Accordingly, the bar patterns in the sensing layer 640b may have a width such that the minimum area for recognizing the touch operation of the body part, such as the finger, is satisfied, and the openings and the protruding bar patterns are formed to reduce the total area of the sensing layer 640b. Therefore, it is possible to minimize parasitic capacitance CH between the body part, such as the finger, and the sensing layer, thereby making it possible to more accurately measure mutual capacitance CM between the sensing layer 640b and the driving layer 630. The protruding bar patterns 645 are additionally formed in the sensing layer 640b having the openings 646, such that more contour lines are formed and the amount of change in mutual capacitance CM increases when an object touches the touch sensor panel, making it easy to determine the presence/absence of the touch operation.

Figure 11:
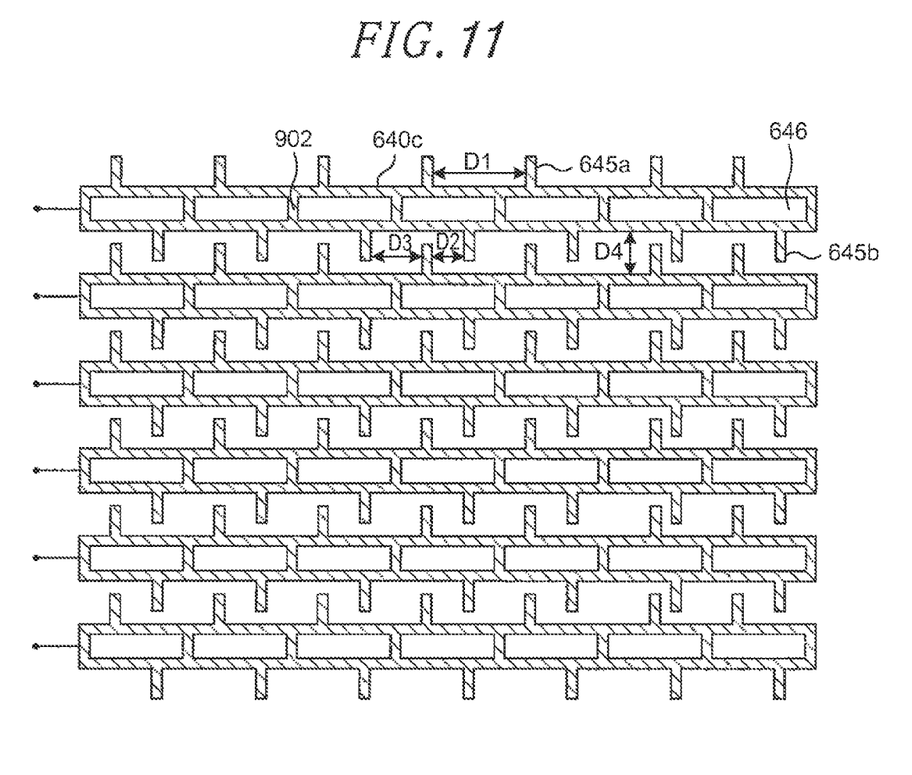

FIG. 11 shows a sensing layer pattern in accordance with another embodiment of the present invention.

Referring to FIG. 11, in accordance with another embodiment of the present invention, the sensing layer 640c is formed in a bar shape having a width such that the minimum area between the sensing layers 640c for recognizing the touch operation of the body part, such as the finger, is satisfied, and a plurality of openings 646 are formed in a ladder shape in the central portion of the sensing layer 640c of the bar pattern to decrease parasitic capacitance. The dimensions of sensing layer 640c can generally be the same as those of sensing layer 640b discussed above with respect to FIG. 10. In many embodiments, the pattern of sensing layer 640c may have symmetry in each unit cell (e.g., opening 646, longitudinal lines adjacent to opening 646, bridge 902, and protrusions 645a and 645b).

Subsequently, protruding bar patterns or protrusions 645a and 645b are formed adjacent to each opening 646, and unlike FIG. 10, two bar patterns having a given length protrude from portions of the second electrode adjacent to each opening

646, but not necessarily from central portions of each opening 646. The length and width of protrusions 646a and 645b may be the same as those of bar patterns 645 discussed above with respect to FIG. 10. Additionally, the distance D1 between adjacent protrusions 645a may be the same as distance D1 discussed above with respect to FIG. 10 (e.g., 0.5-3,000 µm), and the dimensions of openings 646 may be the same as those of openings 644 discussed above with respect to FIG. 8 (e.g., a width of about 0.2-2,000 µm, and/or a length of about 0.5-5,000 µm).

Protrusion 645a may protrude in a direction parallel to that of a protrusion 645b of an adjacent sensing layer. For example, a distance D2 between protrusion 645a and a first adjacent protrusion 646b of an adjacent sensing layer may be less than half of the length of opening 646 (e.g., 0.25-2,500 µm). Additionally, a distance D3 between protrusion 645a and a second, adjacent protrusion 645b of an adjacent sensing layer may be greater than half of the length of opening 646 (e.g., 0.5-3000 µm). That is, the protrusion of a first sensing layer 646a may be located closer to a first adjacent protrusion of an adjacent sensing layer than to a second adjacent protrusion on the adjacent sensing layer. Alternatively, D2 may be equal to D3, and protrusion 645a is an equal distance from adjacent protrusions 646b on an adjacent sensing layer. Thus, the spacing between protrusions from adjacent sensing layers may be equal, or may be different to allow for various spacings between the adjacent protrusions.

The distance D4 between adjacent sensing layers 640c can be any distance greater than the length of protrusion 645a plus a width of the longitudinal lines in the bar pattern 640c (e.g., any length greater than about 0.5 µm, such as 2 µm, 5 µm, 10 µm, 50 µm and the like). Preferably, length D4 is about equal to the length of protrusions 645a plus one to two times the width of the longitudinal lines of bar pattern 640c.

Accordingly, the sensing layer 640c may have a width such that the minimum area for recognizing the touch operation of the body part, such as the finger, and the openings and the protruding bar patterns are formed, thereby forming more contour lines. With the above-described structure of the sensing layer 640c, it is possible to minimize parasitic capacitance CH between the body part, such as the finger, and the sensing layer, making it possible to more accurately measure mutual capacitance CM between the sensing layer 640c and the driving layer 630.

Figure 12:
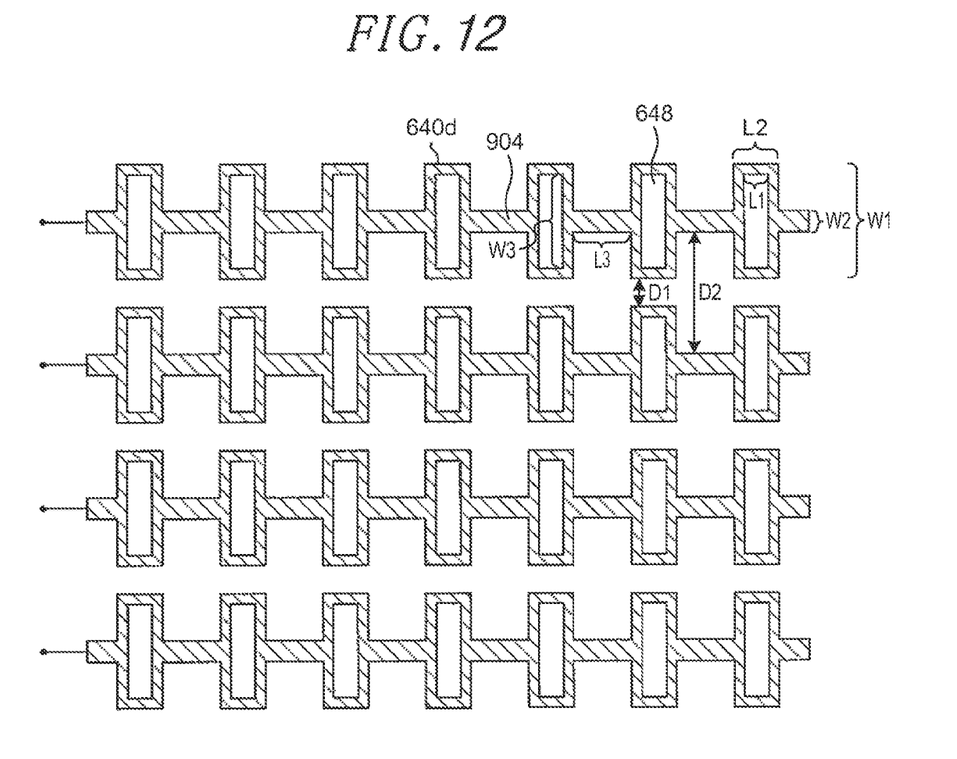

FIG. 12 shows a sensing layer pattern in accordance with another embodiment of the invention.

Referring to FIG. 12, in accordance with another embodiment of the invention, the sensing layer 640d is formed in a bar shape having a width such that the minimum area between the sensing layer 640d for recognizing the touch operation of the body part, such as the finger, is satisfied, and the pattern of the sensing layer 640d is formed such that a plurality of rectangular patterns each having an opening 648 in the central portion thereof are arranged, thereby decreasing parasitic capacitance.

Accordingly, the sensing layer 640d has a width such that the minimum area for recognizing the touch operation of the body part, such as the finger, is satisfied, and the bridges that connect the openings and the rectangular patterns are formed to reduce the total area of the sensing layer 640d. Therefore, it is possible to minimize parasitic capacitance CH between the body part, such as the finger, and the sensing layer, making it easy to more accurately measure mutual capacitance CM between the sensing layer 640d and the driving layer 630.

As shown, the dimensions of certain structures in sensing layer 640d may be the same as or different from the dimensions of sensing layers 640a, 640b, and 640c discussed above with respect to FIGS. 9, 10, and 11, respectively. For example, bar patterns 640d may have a width W1 from about 1.5-5,000 µm, and bridge portions 904 may have a width W2 of about 0.5-1,000 µm. Additionally, the width W3 of each of the openings 648 may be about 1-4,000 µm.

Each of the openings 648 may have a length L1 of about 1-2,000 µm, and the length L2 of each of the parallel lines along the length of the sensing layer 640d can be about 1.5-3,000 µm. Similarly, the bridge portion 904 may have a length L3 of about 1-5,000 µm.

A distance D1 between adjacent sensing layers 640d may be about 1-3,000 µm (e.g., about 1-2 times the width W2 in one embodiment), and a distance D2 between adjacent bridge portions 904 of adjacent sensing layers 640d may be equal to the sum of the width W1 and the distance D1 (e.g., about 3-8,000 µm).

Figure 13:
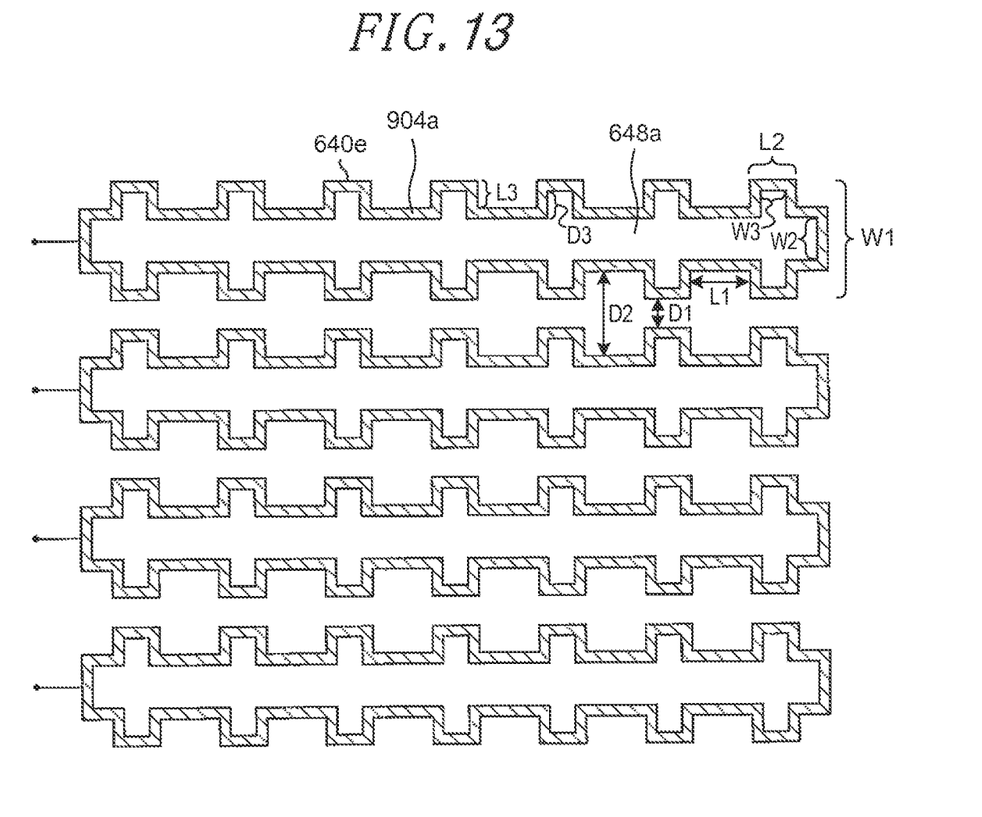

FIG. 13 shows a sensing layer pattern in accordance with another embodiment of the present invention.

Referring to FIG. 13, in accordance with another embodiment of the present invention, the sensing layer 640e is formed in a bar shape having a width such that the minimum area between the sensing layers 640e for recognizing the touch operation of the body part, such as the finger, is satisfied and openings are formed having an empty space in the central portion thereof, and a pattern is formed such that crenellated or concavo-convex shapes are formed at regular intervals in the bar pattern of the sensing layer, thereby decreasing parasitic capacitance.

Accordingly, the sensing layer 640e has a width such that the minimum area for recognizing the touch operation of the body part, such as the finger, is satisfied, and crenellated or concavo-convex shapes are formed, thereby forming more contour lines in the sensing layer 640e.

The sensing layer 640e may have the same dimensions as those discussed above with respect to FIGS. 7-11. For example, the width of sensing layer 640e (including opening 648a) may be equal to that of sensing layer 640d in FIG. 12 (e.g., about 1.5-5,000 µm). The width W2 of the central portion of opening 648a may be about 0.5-2,000 µm. Additionally, the width W3 of the protruding rectangular portions of openings 648a may be about 0.5-2,000 µm (e.g., 1-1,000 µm). Furthermore, the length D3 of the protruding rectangular portions of openings 648a may be about 0.5-2,000 µm.

The length L1 of bar portions 904a may be about 1-5,000 (e.g., the same length as each of bar portions 904a discussed above with respect to FIG. 12). Additionally, a length L2 of the sensing layer 640d surrounding protruding rectangular portions of openings 648a may be about 1.5-3,000 µm.

A distance D1 between protruding rectangular portions of openings 648a surrounded by sensing layer 640e may be the same as distance D1 discussed above with respect to FIG. 12 (e.g., about 1-2,000 µm). Similarly, distance D2 may be the same as distance D2 discussed above with respect to FIG. 12 (e.g., about 3-8,000 µm).

With the above-described structure of the sensing layer 640e, it is possible to minimize parasitic capacitance CH between the body part, such as the finger, and the sensing layer, making it possible to more accurately measure mutual capacitance CM between the sensing layer 640e and the driving layer 630.

As described above, the two-layer mutual type touch sensor panel in accordance with the embodiments of the present invention measures mutual capacitance between the sensing layer and the driving layer to sense a touch operation, provides various sensing layer patterns capable of maximizing the contour lines of the sensing layer and reduces an area with an empty space in the central portion of a sensing layer pattern. Accordingly, when a user touches the surface of a display unit of a touch sensor panel with his/her body part, such as his/her finger, it is possible to minimize parasitic capacitance between the body part, such as the finger, and the sensing layer of the touch sensor panel to more accurately measure mutual capacitance between the sensing layer and the driving layer, thereby increasing sensing accuracy.

In regard to the sensing layer pattern, since various patterns in which an empty space is formed in the central portion of the bar pattern of the related art are implemented, it is possible to narrow the area between the sensing layers while minimizing parasitic capacitance compared to the bar pattern of the related art, thereby reducing the minimum touch area. It is also possible to decrease resistance between the sensing layer and the driving layer, making it possible to more accurately measure mutual capacitance between the sensing layer and the driving layer.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A touch sensor panel comprising:
    a plurality of first electrodes; and
    a plurality of second electrodes above the plurality of first electrodes, each second electrode having a longest axis perpendicular to a longest axis of the plurality of first electrodes, wherein each second electrode comprises a sensing layer having one or more openings therein and a plurality of protrusions therein or therefrom, each of the one or more openings has a dimension greater than at least one dimension of each of the protrusions, and a distance between adjacent sensing layers is greater than a length of one of the protrusions plus a width of a longitudinal line in the sensing layer.

2. The touch sensor panel of claim 1,
    wherein the plurality of first electrodes are arranged in parallel.

3. The touch sensor panel of claim 1,
    wherein each of the plurality of second electrodes has a bar pattern arranged to cross at least one of the first electrodes.

4. The touch sensor panel of claim 3,
    wherein each of the second electrodes has a plurality of openings and a bridge region between adjacent ones of the plurality of openings that is positioned above at least one of the first electrodes.

5. The touch sensor panel of claim 3,
    wherein each of the second electrodes has a plurality of openings and a bridge region between adjacent ones of the plurality of openings that is positioned between adjacent ones of the plurality of first electrodes.

6. The touch sensor panel of claim 3,
    wherein the one or more openings comprises an empty space in a central portion of the second electrode, and has a crenellated or concavo-convex pattern.

7. The touch sensor panel of claim 1,
    wherein each of the plurality of first electrodes has a bar pattern.

8. The touch sensor panel of claim 1,
    wherein each of the second electrodes has one or more bar patterns having a given length that protrude from the second electrode, and each of one or more bar patterns is adjacent to a central portion of a corresponding one of the one or more openings.

9. The touch sensor panel of claim 8, wherein the bar patterns have a length that is about equal to the width of the openings.

10. The touch sensor panel of claim 8, wherein a width of each of the bar patterns is equal to a width of the longitudinal line in the sensing layer of the second electrode.

11. The touch sensor panel according to claim 1,
    wherein each of the second electrodes has one or more bar patterns having a given length that protrude from lateral portions the second electrode adjacent to the one or more openings.

12. The touch sensor panel of claim 11, wherein the given length is equal to a width of the one or more openings.

13. The touch sensor panel according to claim 1,
    wherein each of the second electrodes has a plurality of rectangular patterns, each having an opening in the central portion thereof and arranged at regular intervals.

14. The touch sensor panel of claim 13, wherein a bridge portion of each of the second electrodes that is between adjacent rectangular patterns has a width greater than that of the sensing layer surrounding the rectangular patterns.

15. The touch sensor panel of claim 13, wherein each opening of each of the plurality of rectangular patterns is connected to an opening of an adjacent rectangular pattern.

16. The touch sensor panel of claim 1,
    wherein each of the first electrodes is a transparent electrode or a nontransparent electrode.

17. The touch sensor panel of claim 1, wherein each of the second electrodes is a transparent electrode or a nontransparent electrode.

18. The touch sensor panel of claim 1, further comprising an insulating layer between each of the first electrodes and the second electrodes.

19. The touch sensor panel of claim 1, wherein a distance between adjacent protrusions is about equal to a length of the openings.

20. The touch sensor panel of claim 1, wherein a distance between adjacent protrusions from adjacent sensing layers is less than half of a length of the openings.

* * * * *